INVENTORS
GRANT N. WILLIS
FRANK A. CLARY, JR.

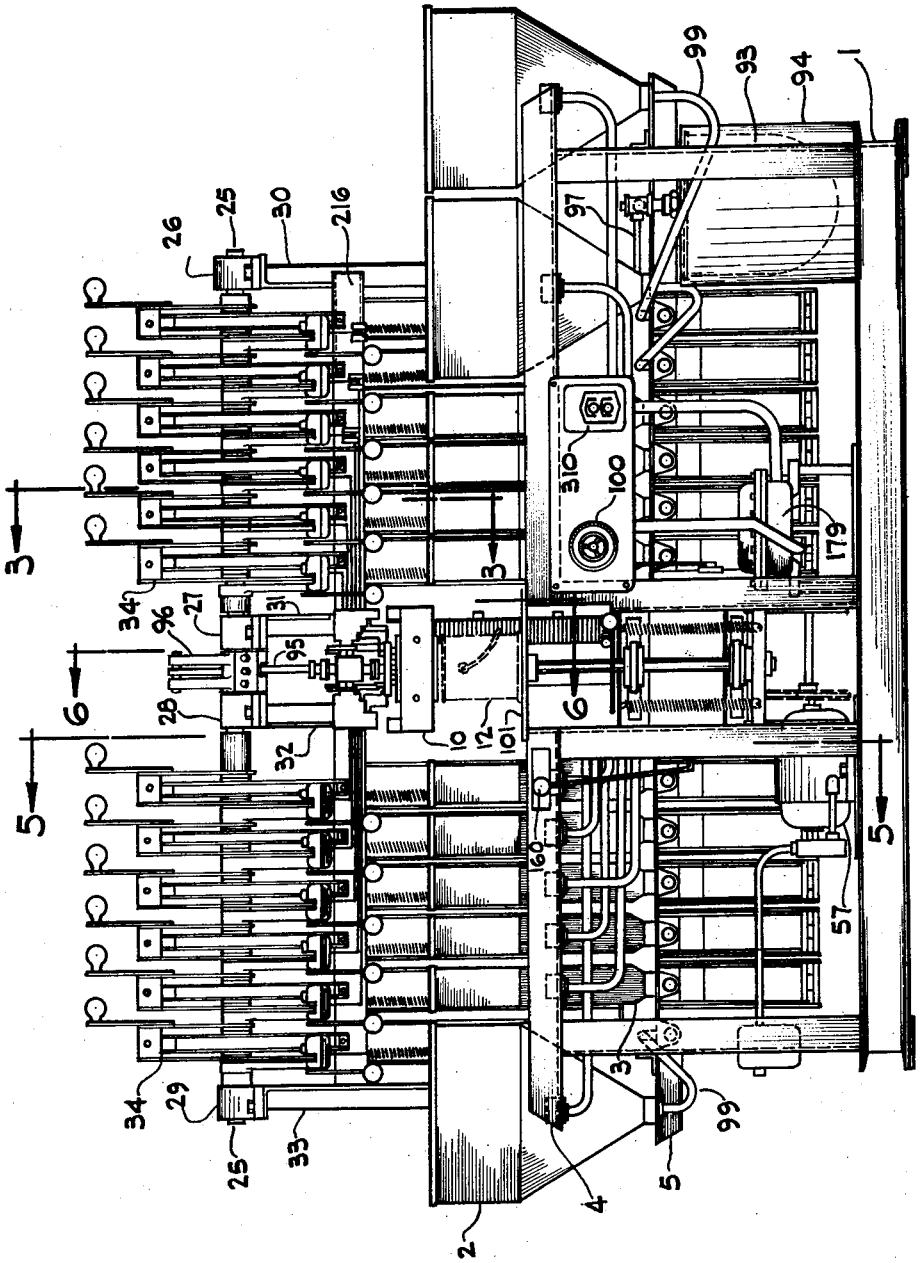

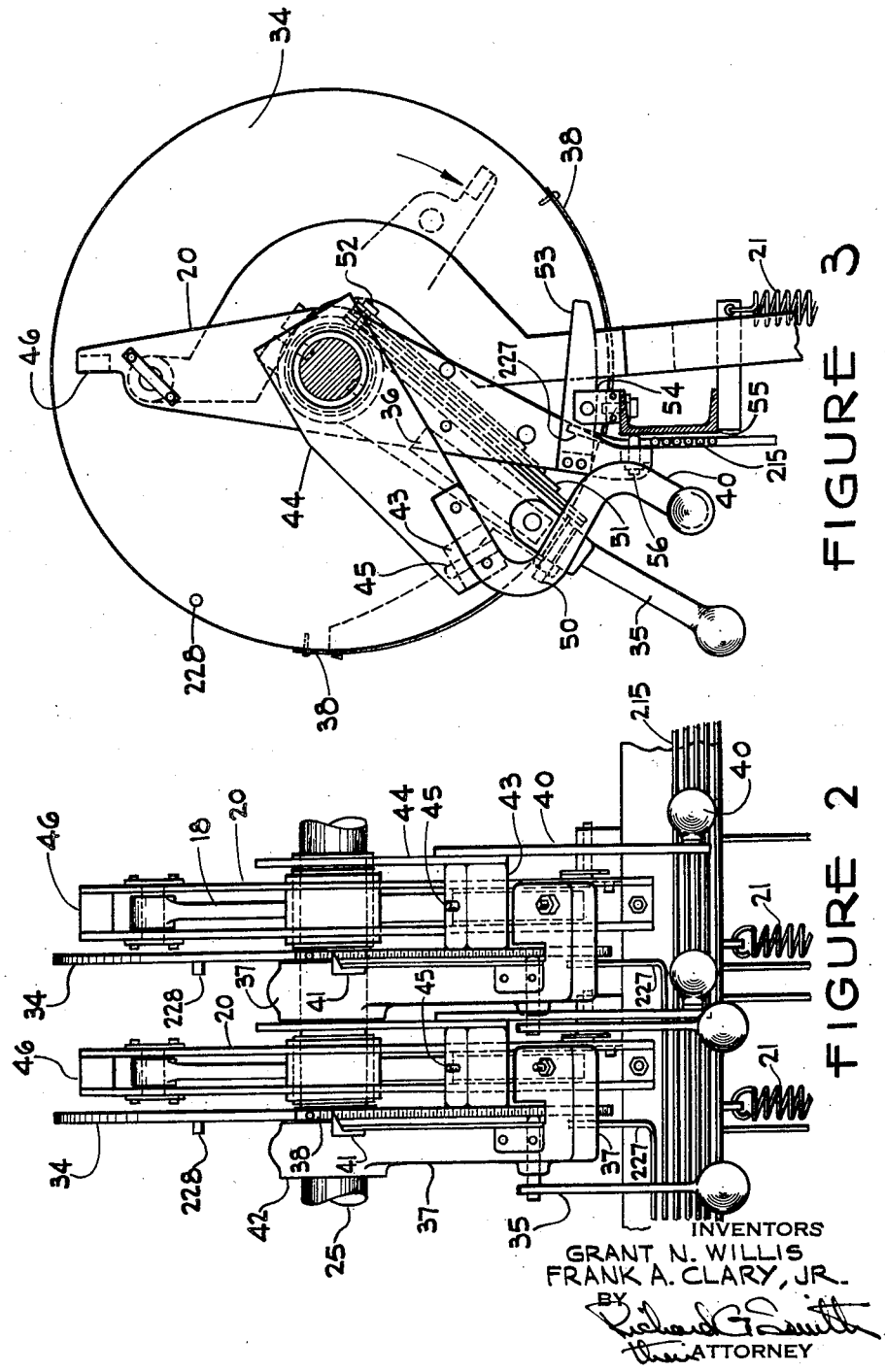

June 18, 1957　　G. N. WILLIS ET AL　　2,796,194
DISPENSING MACHINE

Filed Aug. 14, 1953　　14 Sheets-Sheet 6

INVENTORS
GRANT N. WILLIS
FRANK A. CLARY, JR.
ATTORNEY

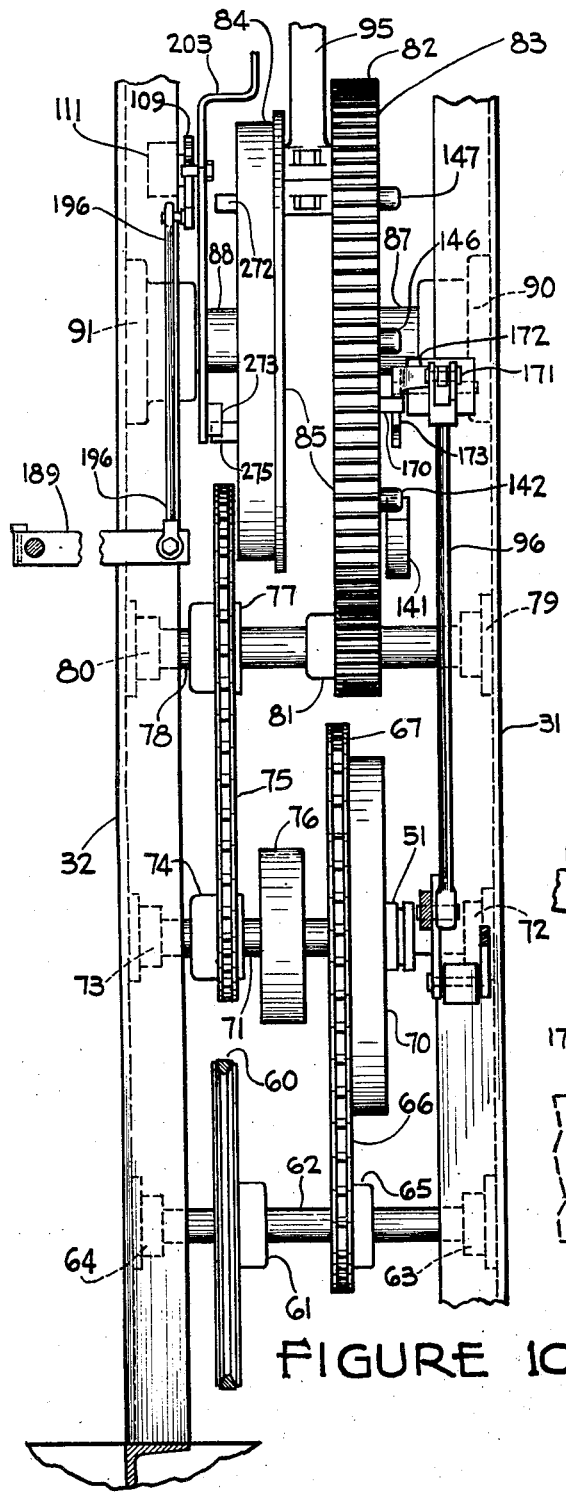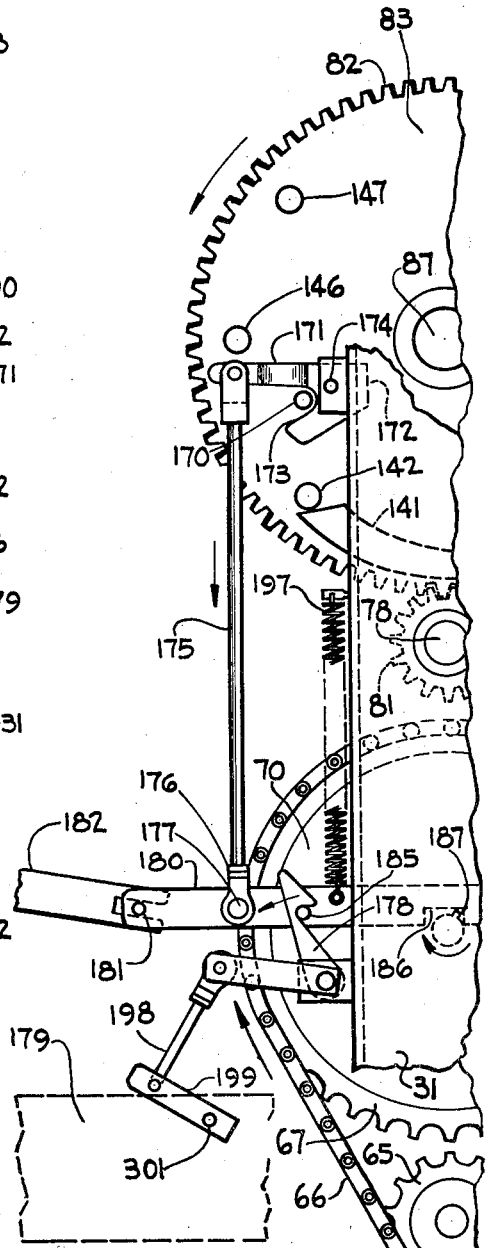
FIGURE 10
FIGURE 11
INVENTORS
GRANT N. WILLIS
FRANK A. CLARY, JR.
BY
ATTORNEY June 18, 1957  G. N. WILLIS ET AL  2,796,194
DISPENSING MACHINE Filed Aug. 14, 1953. 14 Sheets-Sheet 13

INVENTORS
GRANT N. WILLIS
FRANK A. CLARY, JR.

June 18, 1957     G. N. WILLIS ET AL     2,796,194
DISPENSING MACHINE
Filed Aug. 14, 1953     14 Sheets-Sheet 14

INVENTORS
GRANT N. WILLIS
FRANK A. CLARY, JR.

2,796,194

DISPENSING MACHINE

Grant Noble Willis and Frank Alfred Clary, Jr., Bristol, Conn., assignors to The Martin-Senour Company, Chicago, Ill., a corporation of Ohio Application August 14, 1953, Serial No. 374,302

11 Claims. (Cl. 222—1)

This invention pertains to a machine for both maintenance and metered dispensation of liquids.

More particularly, this invention relates to a machine for storage and delivery of predetermined total quantities of protective and decorative coatings of a predetermined hue, value and chroma merely by dialing for delivery of the essential components in the quantities dictated by the color selected. The over-all total volume of the ultimate color desired, as well as the color itself, is determined by pre-set controls of the machine. Once set, the color making operation proceeds automatically, free of human frailty.

It must be acknowledged that the successful operation of the machine herein described owes much to prior work upon formulation of base colorants having reproducible characteristics and uniform spectral effect in producing a desired palette of color. Application of metrical systems to color-matching problems has never been entirely overcome by the paint industry and this is particularly so in items outside specialty lines. It is standard procedure, both in the United States and in countries foreign to the United States, to employ skilled color-matchers or shaders whose duty it is to match the new production of a color to a standard reference color. This appears to be essential due to the variation in quality of raw materials used by the paint maker. Thus it should be made clear at the outset that reproducible color bases of controlled character are inherently essential to the successful use of custom color dispensing machines as herein described.

However, even though color bases employed are of high quality and of standard nature, many additional mechanical problems have long delayed the successful advent of a machine making possible repeated reproduction of colorant of requisite hue, value and chroma to match a color selected from a palette of color, practical.

One of these problems resides in the fact that suspensions of pigment particles in a vehicle capable of depositing a film is difficult to maintain in a uniform state. That is, some pigmentary components may settle out more rapidly than others. Some settle out to produce hard dry cakes most difficult to re-disperse. Thus it can be seen that one or more colorants in storage may not retain uniform color strength and therefore fail to yield, when mixed with other colorants, a product of reproducible color characteristics.

A second problem is one of accuracy of metering the various component colorants with the requisite accuracy. For example, many colors require very small amounts of black to bring them into agreement in shade with the color to be matched. If one were to construct a machine with small volume displacement pumps to satisfy the accuracy requirements for metering the amount of black shading base essential to color matching, then the number of strokes of the pump essential to deliver quantities of a black or a very dark paint would present a severe wear problem upon the mechanism, undue time would be required in producing the necessary quantities, and the problem of the number of strokes would, of course, multiply error of displacement with every stroke, limiting accuracy.

A third problem is one of delivery of the metered colorants to the receiving vessel concurrently. Heretofore, methods and means have been proposed utilizing volume measurement and weight measurement means which means had to be manually moved to each dispensing storage vessel. The amount of colorant metered out has been subject to human frailty at each manual determination of quantity of each component of color essential to the final composition. Further, as only gravity feed of color has been used, no practical force has been employed to assist in intermixing the various metered colorant to produce a uniform final product. Time, of course, is lost at each weigh station.

A fourth problem has been the spacial requirements of proposed machines for custom color manufacture. All proposed machines heretofore devised rely solely upon rotary stirring devices to maintain color uniformity. Either the storage tanks themselves were of cylindrical form and were provided with internal rotary agitators, or the machine itself rotated cylindrical containers holding the supply of colorant. In either case, as the number of individual colorants became practical in number to produce the requisite palette of color, the size of the machine grew to impractical size or unwieldly proportion.

A fifth problem has heretofore been inherent in all known devices proposed to provide custom-mixed colors. This is in the tendency for paint materials to skin over upon contact with air. Skins so formed may be chopped up by paddle agitator means usually provided to assure uniformity of dispersion. Skin particles are carried into and contaminate the ultimate coating unless strained out.

A sixth problem has been a serious deterrent to accuracy of the color match as well as to the appearance of the container in which the custom color is sold. This problem is generally too slow action of valves shutting off the flow of delivered material immediately that the requisite quantity of color has been metered. Two objections result. One is that the color match is inaccurate; second is that dripping from the valve depreciates the value of the can label due to contamination of the label.

The general object of this invention is, therefore, to provide a practical custom color dispensing machine which provides means to overcome the above enumerated problems.

A specific object of this invention is to provide a custom color paint dispensing machine capable of accurately metering selected quantities of one or more prepared fluid colorants from a plurality of supply tanks by means of metering pumps to a central point where the colorants are intermixed to form a desired final color in a completed decorative coating composition.

A second specific object of this invention is to provide a multiple valve unit fitted with means for ingress of fluid colorants from remote supply tanks, means for control of metered colorants entering units of said valve to direct the flow of colorant either to exhaust ports and delivery or to egress ports to be returned to associated individual supply tanks, the control means conditioning the valves to determine the pattern of operation of individual ones of the valves remote from the multiple valve block in its location.

A third specific object of this invention is to provide a variable displacement metering pump wherein the length of the stroke of the piston is both controlled and varied by means of a calibrated dial, in turn controlling through mechanical linkages hereinafter described in greater detail, the number of degrees of arc traversed by the crank arm controlling piston displacement.

A fourth specific object of this invention is to provide a spring loaded hammer means automatically timed to load and fire both to open and to close selected valves in the multiple valve block unit to direct changes in flow direction of colorant through said valve block.

Various other specific objects of the invention not set forth in detail will become apparent as the description of the machine unfolds.

A preferred embodiment of the invention is illustrated in the accompanying drawings.

Referring to the drawings generally,

Figure 1 is a front elevation of the completely assembled machine.

Figure 2 is an enlarged fragmentary front elevation of an upper assembly of the machine corresponding to that shown in Figure 3.

Figure 3 is an enlarged fragmentary side elevation of a section taken along the line 3—3 of Figure 1.

Figure 10 is an enlarged fragmentary front elevation of the power transmission assembly corresponding to the central section of Figure 1, parts having been removed to reveal detail.

Figure 11 is a side elevation as viewed from the right of Figure 10, after breaking away portions of supporting structure for purposes of clarity.

Figure 5:
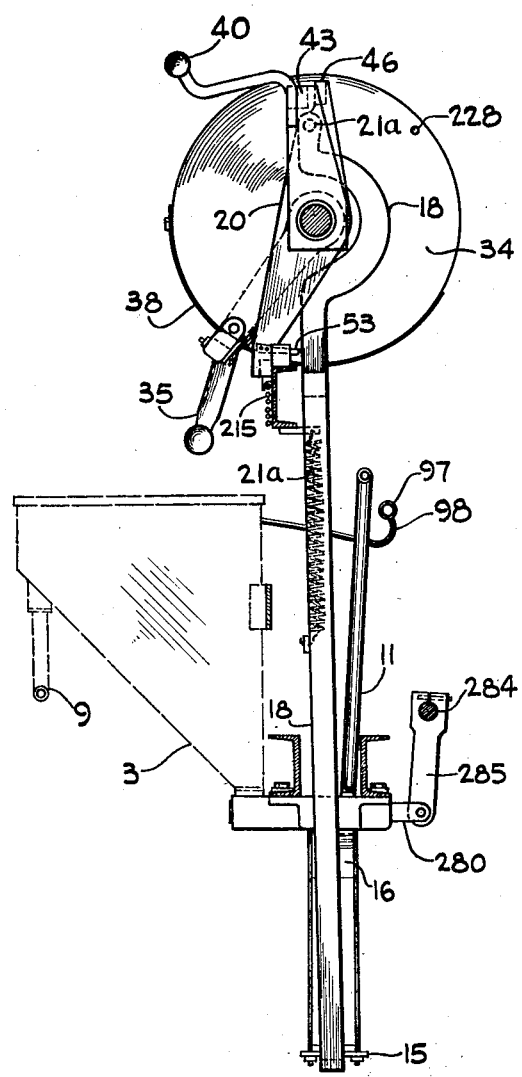
Figure 5 is a side elevation of the unit as shown in Figure 4 taken along the line 5—5 of Figure 1 with parts removed.
Figure 4:
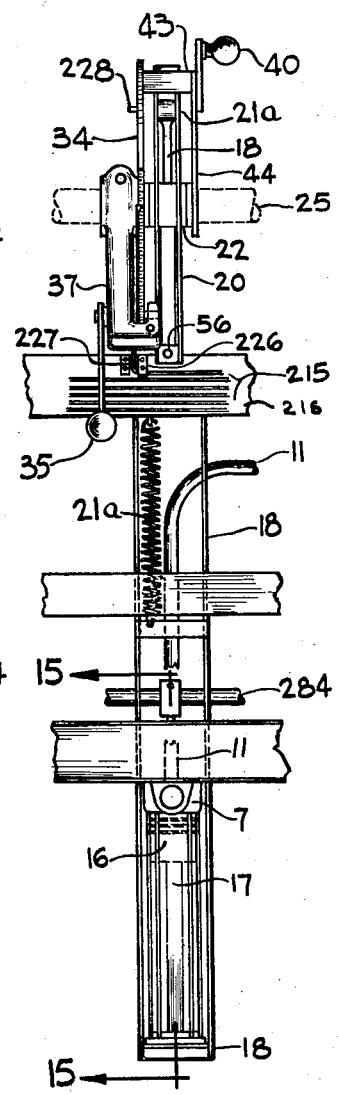
Figure 4 is a front elevation of one unit of the machine corresponding to that shown in Figure 5 with parts removed and broken away for the sake of clarity.

Referring to the drawings in greater detail starting with Figure 1, the automatic color dispensing machine may be assembled and supported by main frame 1 built up of welded angle iron to provide substantial support for a series of paint supply tanks 2 and 3 of various sizes if desired, adapted to easy placement and removal from between main frame horizontal beams 4 and 5. Each of paint supply tanks 2 and 3 are made with ground tapered orifices 6 and 8 (Figure 15) in the underside. The lowermost feed orifices 6 provide cooperative engagement with cylinder head valves 7, while the top tank return orifices 8, couple with return tubes 9 from central valve control block 10. Conduit tubes 9 and 11 provide means by which a fluid colorant may be delivered to valve block 10 and discharged into container 12, or to be returned to corresponding supply tanks 2 and 3, depending upon the particular setting of the machine, as will appear. Cylinder head valve bodies 7 (Figure 15) are bolted to horizontal frame elements 5 of main frame 1 and support cylinder sleeves 13 by hanger rods 14 and cylinder support rings 15. Pistons 16 within cylinder sleeves 13 are operated through first piston rods 17 rigidly attached to connecting rod yokes 18 and piston pins 19. Yokes 18 (Figures 4 and 5) pivotally connect to rocking beams 20, formed of plates and distant pieces, by pin 21a. Rocking beams 20 are freely rotatably by means of their central bearings 22 (Figure 4) about main power driven crankshaft 25.

Main crankshaft 25 (Figure 1) is supported by and is journalled within four pillow blocks 26, 27, 28 and 29 mounted on four vertical frame columns 30, 31, 32 and 33 in turn secured to frame 1 by welding and extend vertically upward from a position midway of frame base 1.

*Metering pumps and their control means*

The extent of the angular rotation of rocking beams 20, connecting rod yokes 18, rods 17 and pistons 16 (Figures 4 and 5) is predetermined by individual settings of each one of the dials 34 which are also freely rotatable about main crankshaft 25 when dials 34 are in an unlocked position. Dials 34 are unlocked by an upward releasing movement of locking levers 35 which releases pressure of strip spring 36 bearing upon the sides of dial plates 34, interiorly of clamping arms 37.

Upon release of clamping arms 37, which are keyed to shaft 25, dials 34 may be set at any calibrated position of the calibration strip 38 mounted about the outer dial periphery by movement of dial handles 40 to the requisite dial setting. Indicators 41 are bolted to clamps 37 and calibration strips 38 are calibrated to read in thousandths of the full piston stroke or thousandths of one quart, which is the total displacement of each of pistons 16 upon full stroke travel in cylinders 13. A full stroke is obtained when the rocking beams 20 are caused to move through an arcuate distance of 120 degrees which occurs when indicator 41 and dial strip 38 of dial 34 are set at 1,000 units or parts. Dials 34 are set in the manner as now described:

Clamp 37 is keyed to main crankshaft 25 at hub 42. Clamps 37, which normally hold dials 34 from all movement except that of main crankshaft 25, are released by lifting dial locking levers 35 which releases compression of locking strips 36 situated between the outer end of clamping arms 37 and dial 34, affixed to clamp 37 bearing against the left hand face of the dial 34. After release, dials 34 may be moved by dial handles 40 through bridging dial stops 43 to supporting element 44 to which dial handles 40 are affixed, also centered about shaft 25, to read upon any number of thousandths of a full delivery stroke or thousandths of one quart of material desired. Such adjustment may be made on any one of the plurality of dial units or any group of dial units. After setting of the dials 34 in accordance with the custom color to be produced, dial locking levers 35 are set by returning them home in a downwardly direction, clamping dials 34 and clamps 37 so that their movement is as an integrated unit.

In setting the dials to correspond to the various colorants to be combined, care must be exercised to be sure that the total of all dial settings to deliver colorants governing the piston strokes is not greater than one thousand units of dial setting, otherwise a greater volume of paint will be delivered than the capacity of the receiving vessel.

Movement of crankshaft 25 is defined by an oscillatory motion in forward and return directions through 123½ degrees of arc. Of this, maximum delivery of liquid by displacement due to piston movement is obtained at not more than 120 degrees of arc. Variations between the constant angular rotation of power shaft 25 and keyed clamping arms 37 in relation to the variable angular rotation of rocking beams 20 is obtained through settings made upon manually controlled dials 34, as described. The drawings (except for Figures 2 and 3) show the said dails positioned to re-circulate liquid colorant to maintain it in a uniform state of suspension in storage tanks 2 and 3. In re-circulate position of dials 34, said dials force rocking beams 20 through about 123 degrees of arc and pistons 16 through their maximum displacement. However, if dials 34 are moved toward the operator by release of clamping arms 37, moving handle 40 downward and then reclamped (as illustratively shown in Figures 2 and 3), crankshaft 25 will move clamps 30 and dials 34 through considerable distance of arc before dial bridge stop 43 and adjusting screw 45 contacts rocking beam 20 at stop 46. As can be seen, there may be more or less lost motion of main crankshaft 25 now connected with dial stop 43 before contact is made with stop 46 of rocking beam 20. The greater the lost motion, the shorter the stroke imparted to pistons 16 and the less the quantity of colorant metered by pistons 16 to multiple valve block 10 through associated conduits 11.

Upon clockwise angular rotation of powered shaft 25, clamping arms 37 locked to dial 34 transfer angular movement from shaft 25 to dials 34, dial stops 43, rocking beam stops 46, rocking beams 20, connecting rod yokes 18, to first connecting rods 17 causing intake of colorant by pistons 16 until the intake stroke is completed. Upon return of crankshaft 25 through 120 degrees plus of counter-clockwise arcuate motion, set-screws 50 in clamping arms 37 contact leaf springs 51 set within the lower half of rocking beams 20 by bolt 52 into the hub thereof. Forces acting through the above-described linkages cause pistons 16 to return in an exhaust stroke to deliver colorant through cylinder head valves 7, individual conduits or tubes 11, central valve block 10 and return to supply tanks 2 and 3 by means of return tubes 9. As the exhaust cycle is completed, knife blades 53 attached to the lower end of rocking beams 20 engage sheaths 54 bolted to horizontal support frame member 55—216 of frame 1 until adjusting screws 56, also at the lower end of rocking beams 20, are brought home against horizontal frame element 55—216.

*Motive power train*

Figure 14:
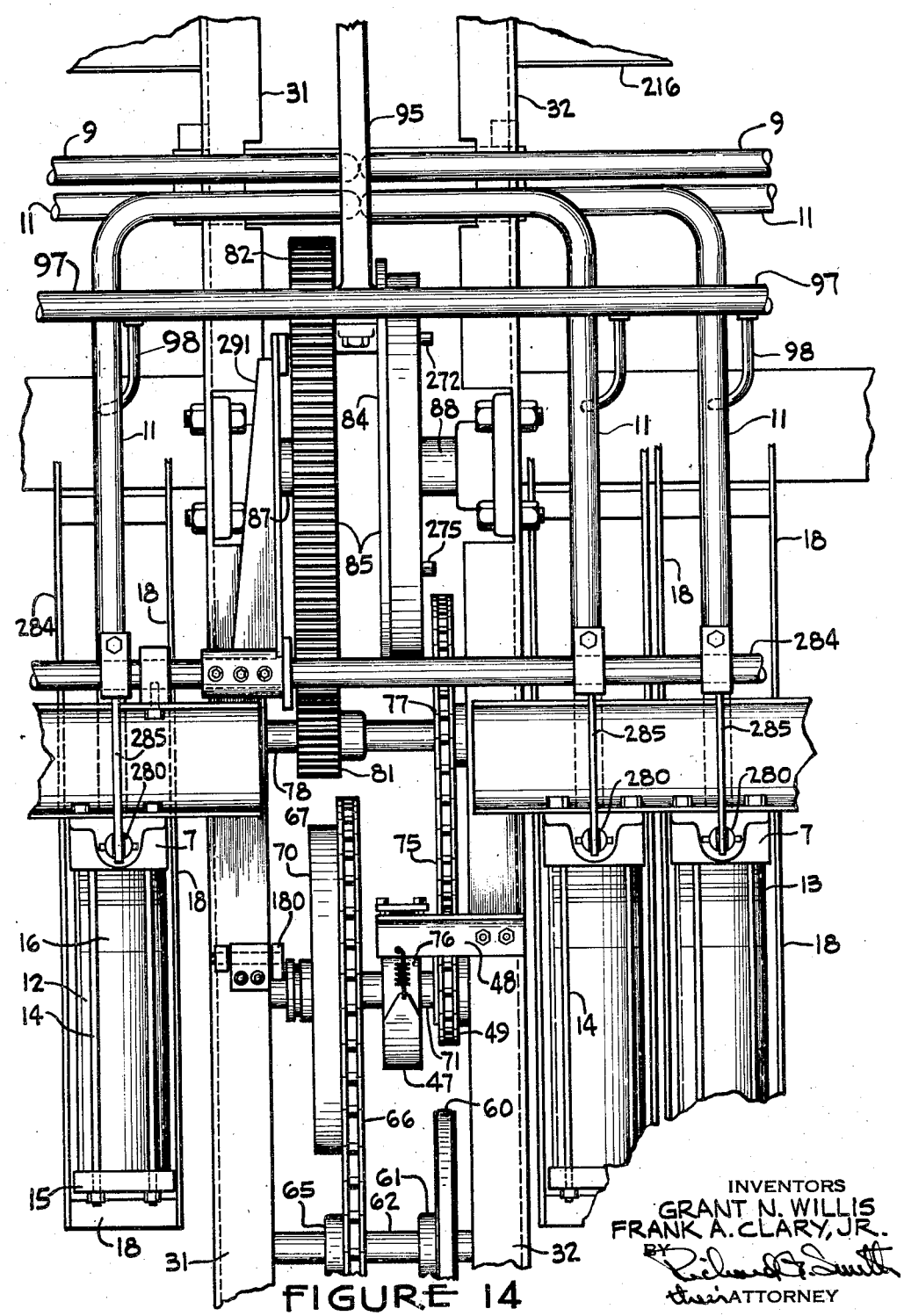
Figure 14 is a fragmentary rear elevation of the central portion of the machine corresponding in general with that shown in front elevation in Figure 10, with parts removed.

The energy causing oscillatory motion of shaft 25, powering metering piston 16 strokes, originates in rotary motion of electric motor 57 supported on frame 1. Rotary motion of the motor 57 (Figure 12) is transferred by V-belt 60 and pulley 61 to shaft 62 supported in end bearings 63 and 64 in frame members 31 and 32 (Figure 14). Gear 65 keyed to shaft 62 transfers motion through chain 66 to chain driven clutch gear 67. Upon engaging of clutch 70 (Figure 10) shaft 71, supported by bearings 72 and 73, is caused to rotate and with it gear 74, gear chain 75, brake drum 76, driven gear 77, shaft 78 in bearings 79 and 80, and spur gear 81.

Spur gear 81 operates timing gear 82, which, in turn, controls all of the various timing elements of the machine. We shall herein refer to the timing gear assembly as 85 which includes the annular timing ring gear 82, the right and left hand wheels 83 and 84 (gear 82 being fitted to wheel 83 and wheel 84 adapted to receive a similar gear, if needed), crank pin 86 (Figure 12) which is eccentric to the stub shafts 87 and 88 mounted in bearings 90 and 91 in turn supported by frame uprights 31 and 32, stub shafts 87 and 88 and the related timing pins (147, 272, 275, etc.) in the outer faces of wheels 83 and 84 which will be referred to as their function is described.

Timing gear assembly 85 acts with respect to its main shafts 87 and 88 and eccentric crank pin 86 as a crankshaft providing oscillatory motion, when activated, for main connecting rod 95, main crank throw 96 (Figure 1) and main crankshaft 25. A full revolution of timing gear assembly 85 acts upon connecting rod 95 causing oscillation of main crank 96, power shaft 25 and the cooperating linkages and multiple pump units of the device through crank arms 37.

*Limiting controls—metering pump operations*

Control of the number of oscillations of the shaft 25 is limited by the particular setting of control dial 100 (Figure 1). The machine illustrated in the drawings has been designed to accommodate half gallons, gallons and five gallon containers. Other sizes are, of course, not precluded. Receiving container 12 is placed on can supporting plate 101 (Figure 13) mounted on vertical notched shaft 102 journalled and pinned in the sliding frame base 103 which extends behind the vertical frame member 104 terminating in roll pin 106. Vertical shaft 102 is further supported by horizontal elements 107 and 108 between frame members 104 and 105. Journal bearings 109 and 110 bolted thereto provide slideable support for shaft 102 and table 101. As the size of the container to be filled becomes smaller, cam face 111 of cam lever 112 is engaged by roller 106. Roller 106 deflects the lever 112 against tension of the spring 136 about pivot pin 114. Ratchet wheels 115 and 116, as well as handwheel dial 100 forward thereof, are all keyed to dial shaft 117.

The opposite end of lever 112 terminates in pawl 118 which engages cam ratchet 115 keyed to shaft 117 along with ratchet wheel 116. As handwheel control dial 100 is keyed to shaft 117, movement of dial 100 positions cam ratchet 115 and ratchet wheel 116. Dial 100 is normally set at "Operate," which is the position of dial 100 after completion of the delivery cycle and the removal of a filled can, such as 12. Upon removal of can 12, can feeler 119 moves forward (Figures 13 and 18) moving bell crank 120 outward, returning pawl 121 to a locked position against the flat face of cam tooth 122 of ratchet wheel 116. Thus, if a can is not in position, dial 100 is blocked and cannot be set and the machine may not be operated.

Placement of a container on plate 101 moves can feeler 119 rearward transferring the resultant torque to horizontal arm 123 (Figure 18), deflecting bell crank 120 which is in position, forward of can feeler 119. Tension on link 125 lifts pawl 121 about pivot 126 releasing ratchet wheel 116 so that it may be set by turning dial 100. The degree of movement of dial 100 is, however, limited (Figure 13) by stops 131, 132 and 133 of cam ratchet 115 by blocking action of pawl 118, according to the can size setting. For example, if a five gallon can is placed on table 101 with proper height adjustment of the table, lever 112 is held against stop 135 by spring 136 supported by arm 137 bolted to frame element 104. In this instance, dial 100 can be turned counterclockwise until pawl 118 engages stop 133 of cam ratchet 115.

If, alternatively, a half gallon can is placed with correct adjustment of table 101 height (position as illustrated), roll pin 106 in dotted position 138 holds lever 112 in dotted position 139 with the result that dial 100 can only be moved two clicks of pawl 140, pivoted about pin 141, counter-clockwise, for further movement in this direction is arrested by contact of pawl 118 engaging stop 131 of cam ratchet 115. As the clutch mechanism controlling the number of oscillations of the main crankshaft 25 is governed by the number of degrees of degrees of rotational motion allowed by dial 100, ratchet wheel 116 and cam ratchet 115, it can be seen that the machine cannot deliver a greater number of strokes than corresponds to the size of the can to be filled due to mechanical control linkages in cooperation with filling table 101. Adjustment of the height of table 101 is made by moving control knob 141 toward the operator against the tension of spring 142 about pivot 143. This movement releases knife 144 from notches 145, 146 or 147 (as the case may be) in shaft 102, allowing frame base 103 to be lifted sliding along vertical guides 152 and 153 against collar 148 with assistance of springs 149 and 150 and guided by bearing supports 109 and 110.

Plate 155 bolted to frame element 104 (cut away in part to show operating detail) supports control dial 100 and its correlative operating mechanisms which, in turn, control the number of strokes or oscillations permitted the machine through control of engagement of clutch 70. When control dial 100 is set at "Operate" and control knob 160 on "Deliver" (to the left of "S") ratchet wheel 116 is stopped through pin 161, and cam switch lever 162, lifted on cam tooth 122, in turn lifting rod link 163 which opens the electrical circuit through microswitch 300 of control box 179 (Figure 16) which, as will be shown, releases clutch 70.

Figure 18:
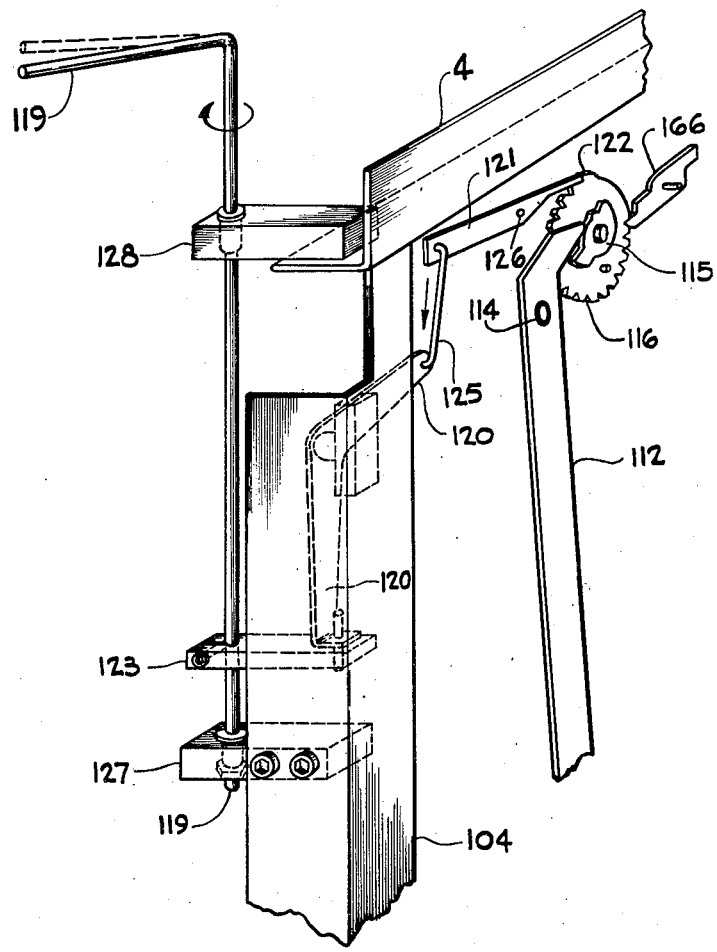
Figure 18 is an enlarged fragmentary perspective view as seen from the lower left hand corner of Figure 13, with parts removed to show operational detail not elsewhere clearly illustrated.

However, if control knob 160 is set to "Deliver" (left of "S") and dial 100 is turned counter-clockwise to count off and control the number of oscillations through which the clutch will engage and activate the driven part of the machine, then lever arm 162 drops, lowering rod-link 163, placing microswich 300 in condition to be energized upon pressing electrical starting switch button 310. Energizing switch 310 and microswitch 300 activates solenoid 301, moving lever arm 199 downward, releasing hook latch lever 178 (Figure 11) from catch pin 185 of clutch trip lever 180, energizing power transmission from the driving mechanism of clutch gear 67 through clutch 70 to shaft 71 and the remainder of the power train causing colorant delivery. The electrical circuits as shown in Figure 18 are treated of in detail later.

Click pawl 140 (Figure 13) is supported by plate 155 and is spring loaded at 164 about pivot 141 to provide click action when indexing dial 100. Ratchet lever arm 165, as shown in the drawings, is in the final position after completion of a delivery cycle, or in "Operate" condition. Ratchet lever arm 165 pivots about dial shaft 117. By counter-clockwise movement of dial 100, ratchet wheel 116 clicks past pawl 140 and spring loaded pawl 166 pinned on lever arm 165 at 167. Each tooth of ratchet 116 corresponds to engagement of clutch 70 for one complete revolution of timing gear assembly 85 and one complete cycle (intake and exhaust stroke) of pistons 16. If two quarts of liquid in total are to be delivered, the pawls 140 and 166 pass over two teeth of ratchet wheel 116. Movement of lever 165, through linkages, as described in the subsequent paragraphs, returns ratchet wheel 116 in a clockwise direction until ratchet wheel 116 and dial 100 are returned to "Operate" position.

Illustratively, presume that dial 100 is set so that two teeth of ratchet wheel 116 are moved counter-clockwise past pawl 166 as determined by clicks of pawl 140. A half-gallon can 12 is positioned on plate 101 to make dial 100 setting possible, as previously described. Control knob 160 is set to "Deliver" position. Dials 34 are set so that not more than a total of 1000 parts are to be delivered from all dials selected to deliver.

Figure 12:
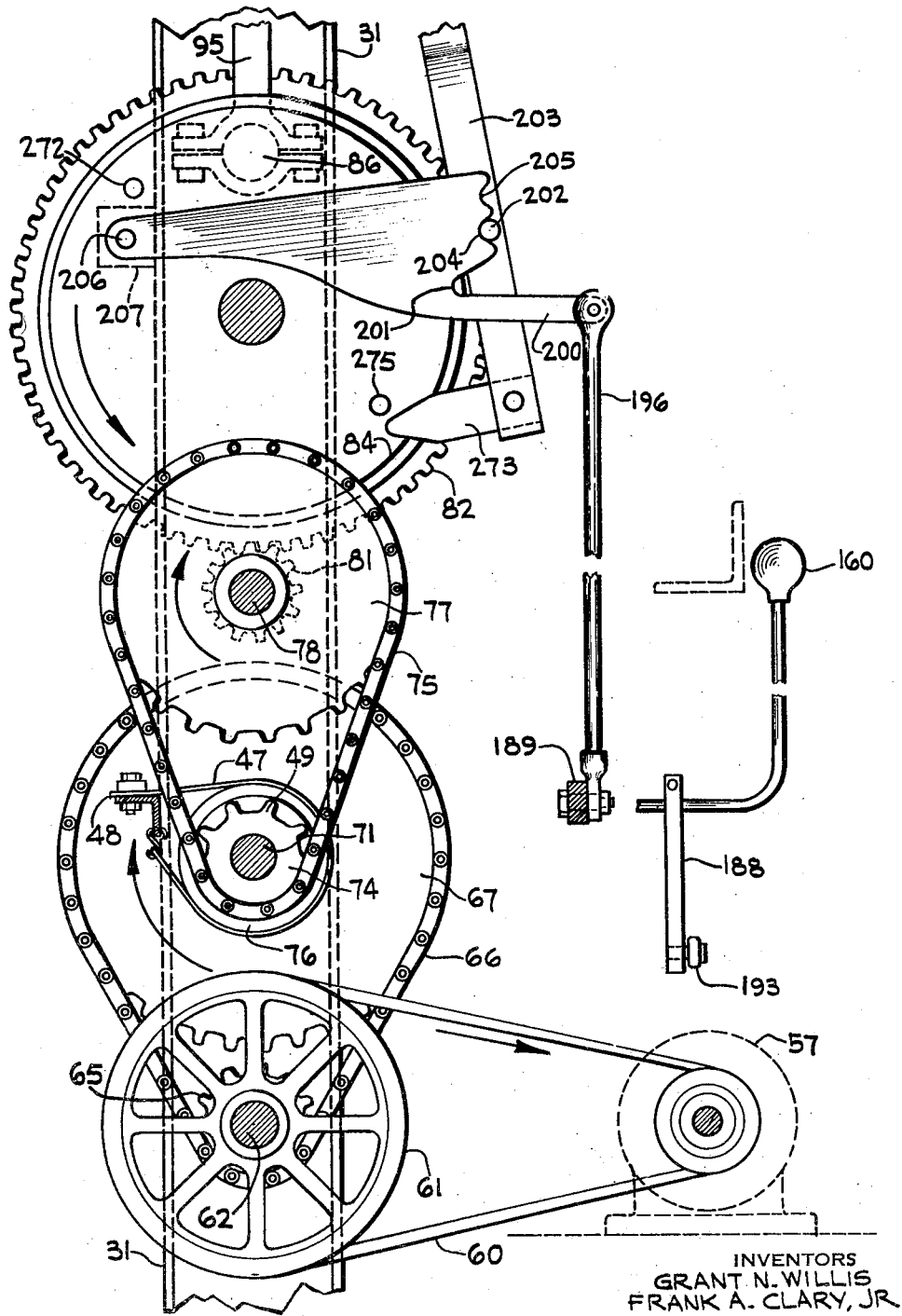
Figure 12 is a side elevation similar to Figure 11, viewed from the left or opposite side of Figure 10, with parts of the supporting structure removed.

The electrical system is started by pushing starter button 302 of switch 310 energizing solenoid 301 and, through circuits later described, motor 57 rotates timing gear assembly 85 through the power train illustrated in Figures 12 and 14 as described.

Figure 17:
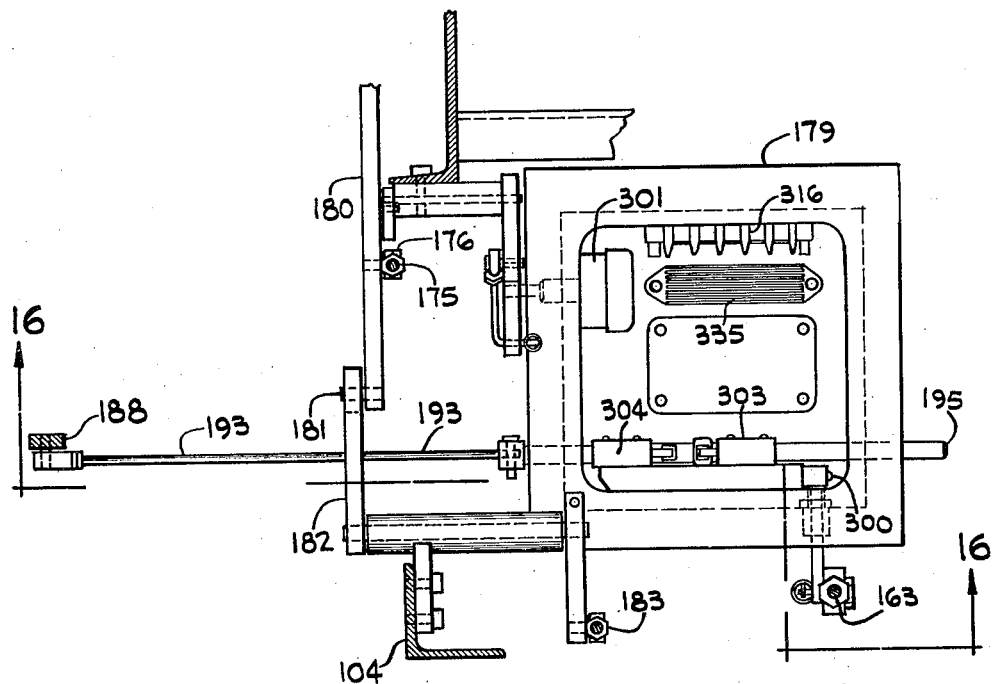
Figure 17 is a corresponding plan view of the assembly illustrated in Figure 16, the cover of the box having been removed.

Upon timing gear assembly 85 being rotated, the pistons 16 take in and deliver colorant to the selected unit valves in valve block 10 and selected valves associated with set dials 34 are driven open by impact of hammer 210. At the end of the first revolution of gear assembly 85, selected ones of valves 220 are fired closed. During the first revolution of assembly 85 (Figure 11), first rollpin 170 in the outer face of wheel 83 passes under bent arm 171 of cam 172 and engages cam arm 173 through pressure along its leading edge, depressing cam 172 about pivot 174 supported by attachment to frame element 31. Movement of cam 172 is transferred by rod 175, clevis 176 and pin 177 to clutch trip lever 180, connector pin 181 and arm link 182 through rotary linkage (as shown in Figure 17) to lift rod 183 (Figure 13) and lever 165 causing spring loaded pawl 166 to engage and rotate ratchet 115 clockwise one tooth. The same events occur during the second rotation (delivery of the second quart) of timing-gear assembly 85, but as ratchet 115 is rotated past the last tooth engaged by pawl 167, lever 162 is raised on cam tooth 122 and rod 163 is lifted. This action opens microswitch 300 in control box 179, de-energizing solenoid 301 causing spring 184 (Figure 16) to pull clutch hook latch 178 (Figure 11) over pin 185 of clutch trip lever 180 disengaging clutch 70 and holding clutch trip lever 180 detent 186 over clutch dog 187. Further movement of timing gear assembly 85 is thus prevented until solenoid 301 is again energized. If solenoid 301 is again energized after appropriate control settings by tripping starter 302 in box 310, clutch trip latch lever 178 is pulled away from pin 185 against tension of spring 184, and clutch trip lever 180 is elevated by tension of spring 197 causing engagement of clutch 70. Clutch trip latch lever 178 is operated through linkage arms 198 and 199 connecting with solenoid 301.

Figure 13:
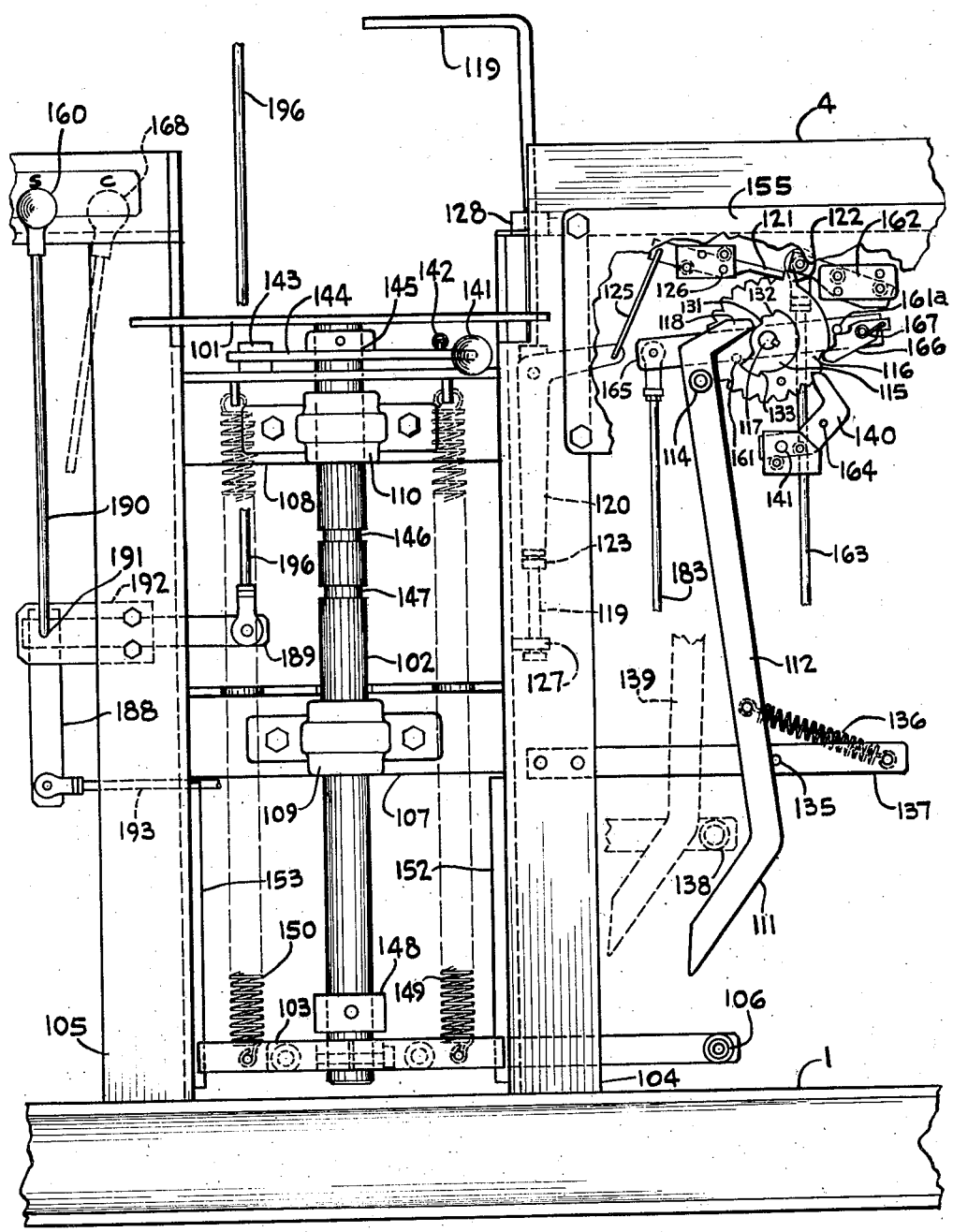
Figure 13 is an enlarged fragmentary front elevation of the assembled machine taken of the central section of Figure 1 with parts removed to reveal operational detail.

The action described occurs only when controller 160 is in position to deliver or "D" (Figure 13). Two other positions of controller 160 are available, namely, "C" or "Continuous circulate" and "S" or "Standby." In Figure 13, the dotted position 168 of the controller corresponds to "Continuous circulate" or "C" position. In the solid position, lever 160 is in "S" or "Standby" position. If moved to extreme left, the position of the lever 160 corresponds to "Deliver" or "D" position.

Moving controller 160 and control lever 190 to a position to the extreme left or "D" (Deliver) causes bell crank arms 188 and 189 rigidly attached thereto to rotate counter-clockwise about pivot point 191 in plate 192 supported and attached to vertical frame section 105. Resultant movement of control rod 193 to the right moves sliding rod 195 (Figure 16) in control box 179 to activate double acting microswitch 303 downwardly. Control rod 196 (Figures 10, 12 and 13) acting through lever arm 189 is at the same time elevated. This action raises selector cam 200 (Figure 12) to position 201 or "Deliver" whereupon pin 202 of trigger arm 203 falls into position 201. Notched position 204 corresponds to "Standby" position and notch 205 corresponds to "Continuous circulate" or "C" position for selector cam 200. Selector cam 200 is pivoted about pin 206 set into block 207 welded to frame section 31.

Figure 16:
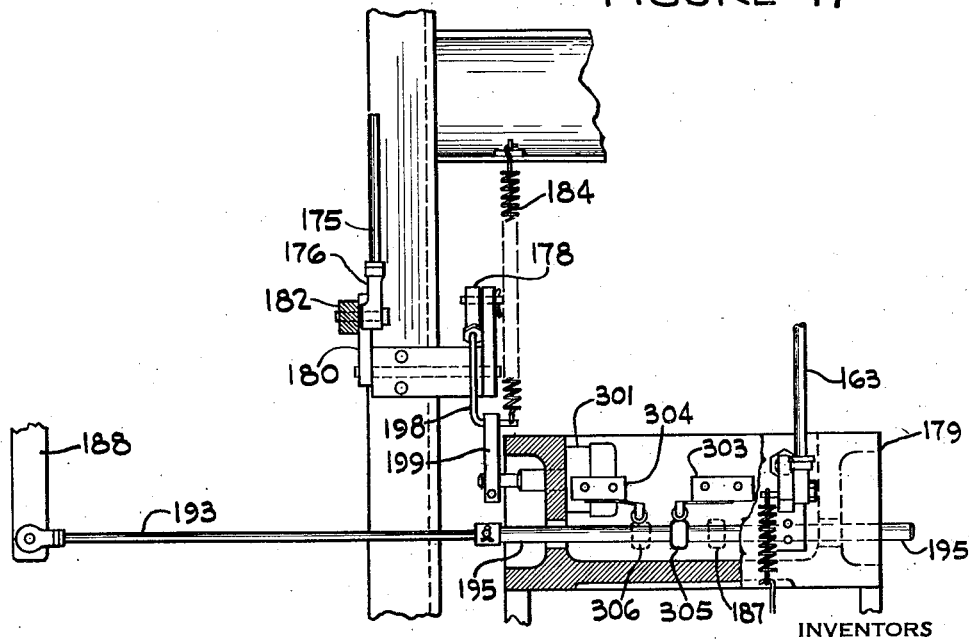
Figure 16 is a side elevation of the main electrical and mechanical control box partly in section along the line 16—16 of Figure 17, with parts broken away.

Shifting of control knob 160 to "Continuous circulate" or "C" position as in Figures 13 and 16 moves arm 188 outward from control box 179 activating microswitch 304 by means of collar 305, which would at that time be shifted to dotted position 306. Control 160 set at "Standby" moves collar 305 to the position shown, activating microswitch 303. On "Deliver" collar 305 is ineffective in position 187, microswitch 304 is de-energized, and double acting microswitch 303 is energized in the downward position.

*Multiple valve dispensing unit control*

Figures 8, 9:
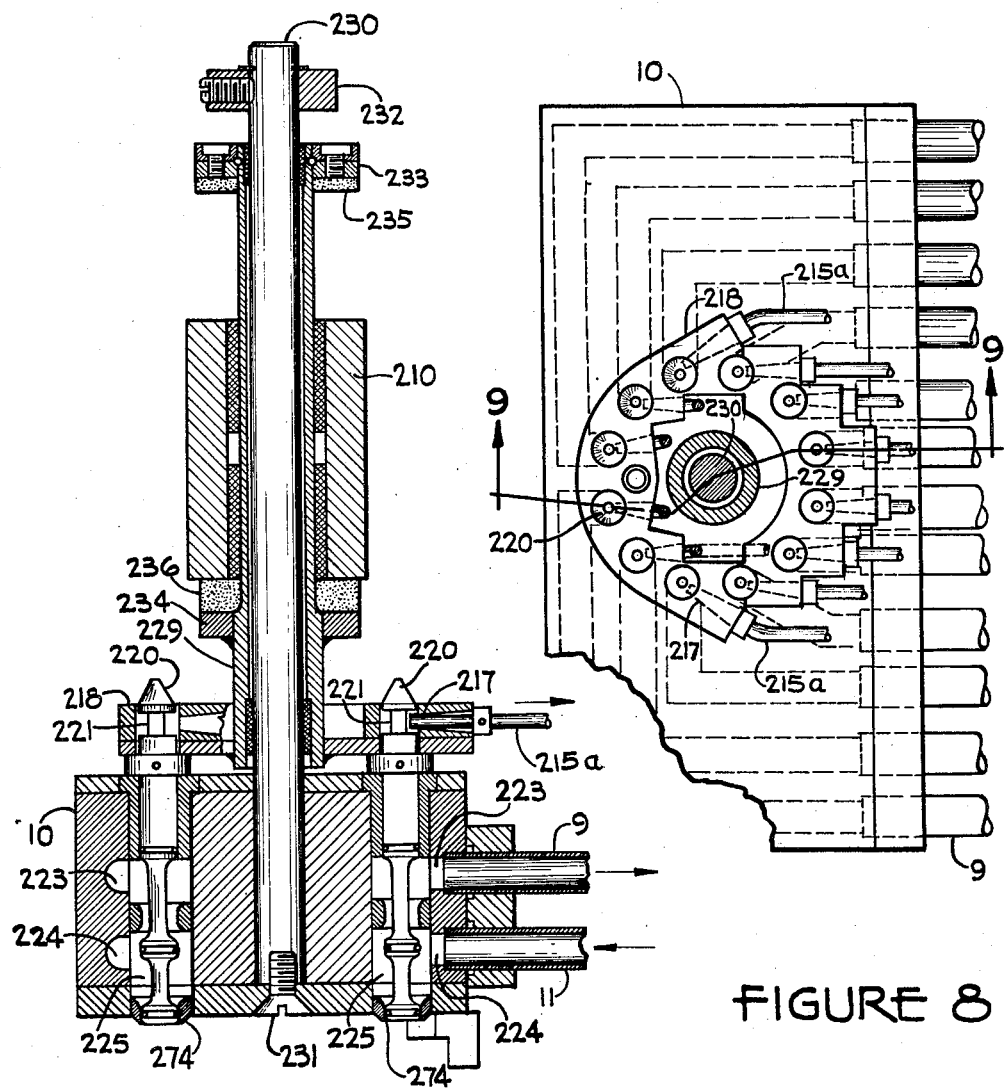
Figure 8 is an enlarged plan view of the multiple valve unit shown in Figure 7, with parts removed and broken way for purposes of clarity.
Figure 9 is an enlarged vertical cross-sectional valve taken along the line 9—9 of Figure 8.

Trigger 203 (Figure 6) controls cocking and firing of hammer 210 which hammer impact opens and closes the individual valves in multiple unit valve control block 10. If control handle 160 is in either "Standby" or "Continuous circulate" position, trigger 203 pivoted about pin 211 forces bar 212 welded to 203 and at right angles thereto, against all saxophone valve rods 215 215a holding them immobilized. Immobilizing saxophone rods 215 215a by this means prevents operational contact of said rods with all the individual unit valves in central valve block 10. Under such conditions, no liquid is deliverable to receiving vessel 12. As can be seen in Figure 9, if all saxophone valve rod 215 215a tips 217 are withdrawn from valve lifting plate 218 to the extent no contact is made with individual valve stem 220 notches 221 by moving control handle 160 to "Standby" or "Continuous circulate" position, as described above, each of the valves 220 in valve block 10 are unaffected by movement of hammer 210.

At "Deliver" position 201 of control handle 160, after selected dials 34 are set to deliver 1,000 units or less of liquid to the requisite unit valves 220 in valve block 10, saxophone rods 215 215a corresponding with dials selected are tensioned forward and away from frame element 216 by rod springs 222 (Figure 6) and released from bar 212 welded to trigger arm 203. Under the spring tension, said selected valves 220 are engaged by saxophone rod 215 215a tips 217 (Figure 9) so that valve lift plate 218 and selected ones of valves 220 will act as a unit upon movement of plate 218 when struck by impact of hammer 210. Additional description of valves 220 and their control means is set forth in subsequent paragraphs.

Liquid colorants metered to conduits 11 flow through valve block 10 around valves 220 and are thereafter returned to storage tanks 2 and 3 by conduits 9 if valves are not selected to operate by pre-setting of dials 34. Circulation of colorant from storage tanks and through block 10 and return provides agitation of stored colorant, thereby maintaining pigment in the colorant in a uniform state of suspension. Under "Standby" conditions, an electric timer in control box 179 (Figures 16, 17 and 18) activates clutch 70 periodically causing all pistons 16 to displace their maximum displacement (when so set to do by dials 34) on each stroke thereof for a predetermined period of time. On "Continuous circulate," clutch 70 engages to produce a continuous pumping of all (or selected) pistons 16 to recirculate fluid colorants from all (or selected) tanks 2 and 3 through valve block 10 and return. "Continuous circulate," in the manner described, may be desirable when the dispensing machine has been completely shut down for an extended period—possibly essential due to an emergency situation.

Referring initially to Figure 9, the structure and operation of the central valve block can best be described. Each individual piston-like valve 220 of valve block 10 has associated with it a conduit 11 leading from each cylinder head valve 7. There are also individual conduits 9 returning therefrom to each of the storage vessels 2 (or 3). Central valve block 10 is drilled so as to provide separate and individual channels 223 and 224 for ingress to and egress from each valve cylinder 225 by means of conduits 11 and 9, respectively. If dials 34 are set to impart more than 120 degrees of arcuate travel to rocking beam 20 and control knob 160 is set for "Standby" or "Continuous circulate," valves 220 remain fixed in closed or by-pass position, as shown throughout the cycle of operation. Upon setting control knob 160 for "Delivery" and selected ones of dials 34 to impart something less than 120 degrees of arcuate travel to rocking beams 20 saxophone rods 215 215a are positioned to move within brackets 226 (Figure 4) holding them against horizontal frame element 216. Vertical saxophone rod components 227 which extend upward (Figures 2 and 4) adjacent the interior face of dials 34 are then in position to be acted upon when dial 34 is oscillated. Pins 228 are set in one face of dials 28 at a point corresponding to 120 degrees plus of arcuate motion of dials 28. When dials 34 are set to impart something greater than 1,000 parts of a full piston stroke or more than 120 degrees of arc during "Delivery" cycle, pins 228 strike the vertical rod components 227, moving elements 227 forward. Forward movement of rod elements 227 of saxophone rods 215 215a, only possible when control knob 160 is set for "Delivery," withdraws rod 215 215a tips 217 from detents 221 of valves 220 (Figure 9) against tension of springs 222 (Figure 6) which springs normally hold rod tips 217 in contact with detents 221. Thus, saxophone rods 215 215a will condition valves 220 in valve block 10 for movement to deliver fluid with each blow of hammer 210, unless dials 34 are set to deliver more that 1,000 parts of colorant. (True in "Delivery" position of control knob 160 only for valves remain closed in "Standby" and "Continuous circulate" positions.) Where dials 34 are set for delivery of 1,000 parts or less of a full piston stroke dial 34 pins 228 do not strike vertical rod components 227 of valve rod linkages 215 215a, and rod tips 217 thereof assisted by tension of spring 222 engage valve plate 218 and valve 220 detents 221. Thus the valves are conditioned to be opened and closed by impact of hammer 210 when fired as will be seen.

Referring particularly to central valve block 10 as shown in Figure 9, valve lift plate 218 is welded to tubular element 229. Tube element 229 is free to slide upwards and downwards upon vertical shaft 230 running centrally through valve block 10 and anchored in its base by screw 231. Vertical shaft 230 terminates above in stop collar 232 keyed to 230, limiting sliding movement of tubular element 229. Anvil collar plate 233 is rigidly attached to tubular element 229 at its upper extremity and anvil collar plate 234 is fixed to tube 229 just above valve plate 218. Each anvil plate 233 and 234 is fitted with facing leather washers 235 and 236 to absorb part of the shock of blows of hammer 210.

*Valve operating hammer means*

Hammer 210 is a short but heavy rectangular piece of metal stock centrally drilled so as to slide freely up and down exteriorly of tubular element 229 and within the confines of anvil plate washers 235 and 236.

Figure 6:
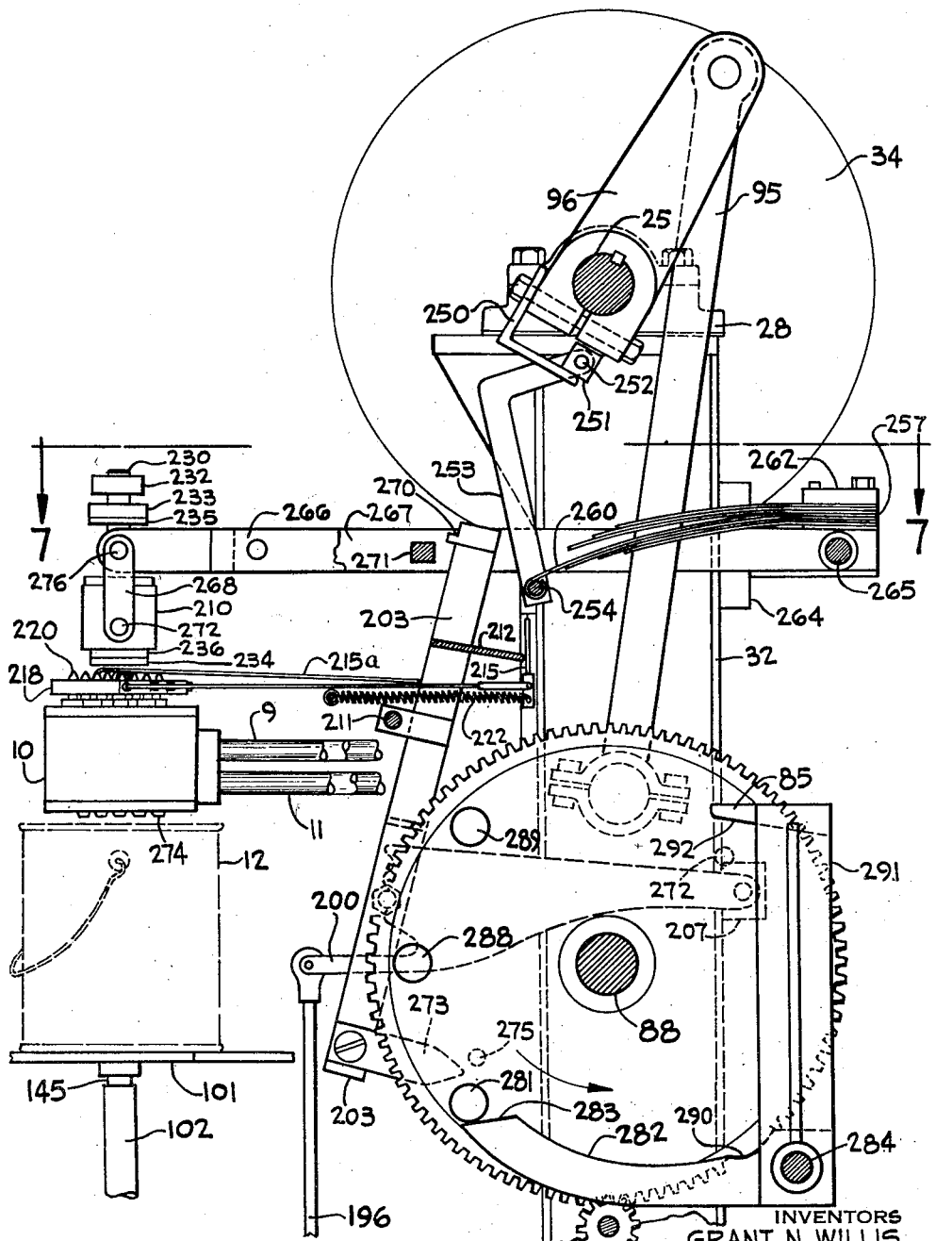
Figure 6 is an enlarged fragmentary vertical sectional elevation taken along the line 6—6 of Figure 1, with parts removed and broken away.
Figure 7:
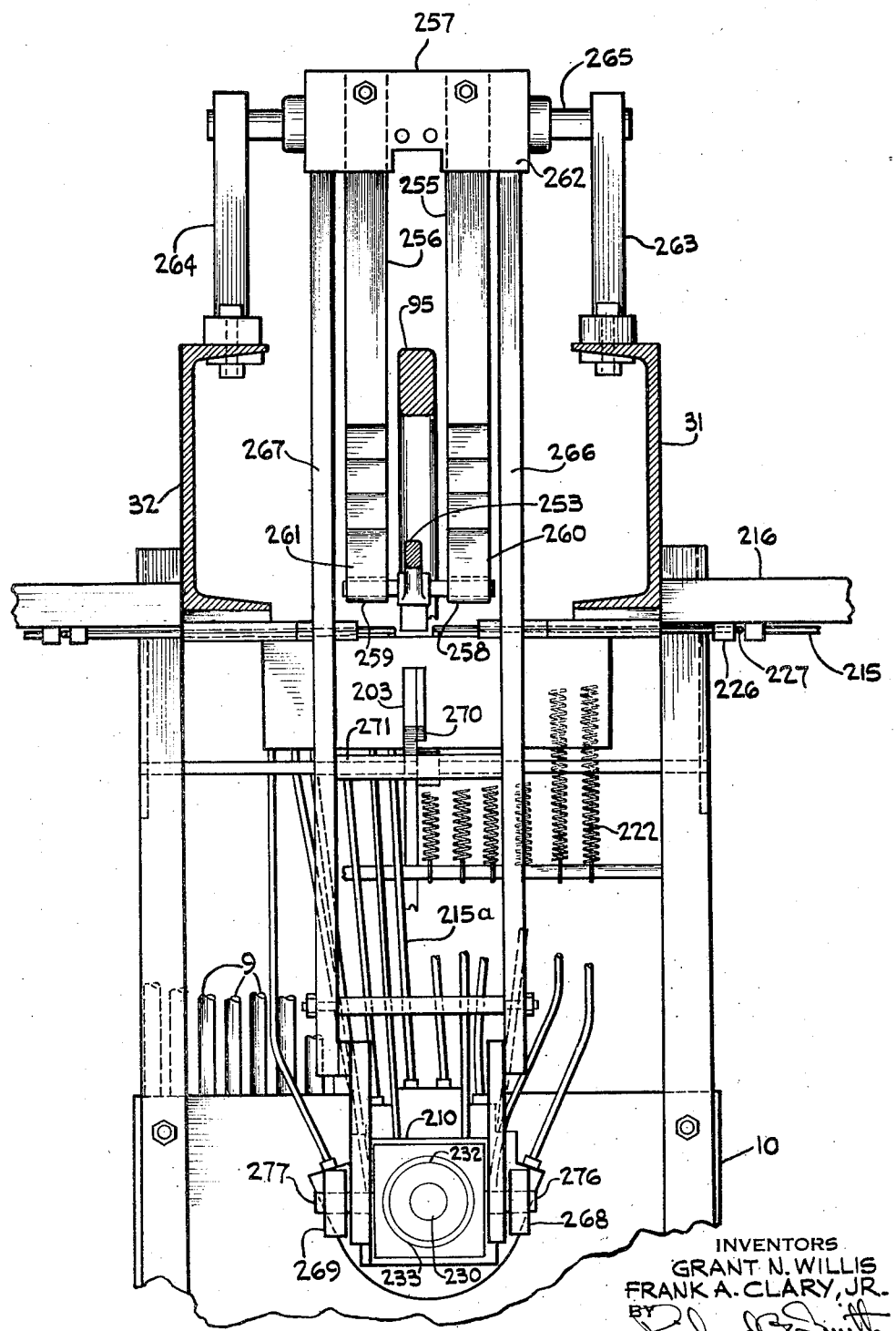
Figure 7 is a plan view of a horizontal section along the line 7—7 of Figure 6 with parts broken away and other parts removed.

To avoid dripping of paint and to provide accuracy of metering of liquids from valves 220 through valve block 10, opening and closing of selected valves is effected by blows of hammer 210, whose operation is now considered with particular reference to Figures 6, 7 and 10.

A short length of angle iron 250 (Figure 6) is bolted to the base of crank 96 and block 251 is welded to the other end. Crank link 253 is pivoted thereto about pivot pin 252. The opposite end of crank link 253 is centered between and pivotally engages long pin 254, each end of which in turn engages assembled spring leaves 255 and 256 of bifurcated leaf spring assembly 257 at 258 and 259 (Figure 7).

Spring assembly 257 is composed of an equal number of leaves above and below main spring leaves 260 and 261. Clamp 262 holds one end of each of the springs making up the bifurcated spring assembly 257 which straddles main connecting rod 95. Clamp 262 is pivotally suspended in bearing mounts 263 and 264 bolted to frame sections 32 and 31, respectively, by means of hammer shaft 265. Hammer arms 266 and 267 exterior of spring assembly 257 are supported by hammer shaft 265 and clamp 262 at one end and operatively attached to either side of hammer 210 at the other end by hammer links 268 and 269 through pins 276 and 277 in 266 and 267 and pins 272 and 273 in hammer links 268 and 269 to hammer 210.

When main crank 96 and main connecting rod 95 are at top kinematic dead center (Figure 6), pintle 270 at the upper end of trigger arm 203 has engaged top side of horizontal stop brace 271 between hammer arms 266 and 267. As the intake stroke starts and main crank arm 96 moves downward, spring assembly 257 is raised by crank arm link 253. Upward motion of spring leaf assembly 257 spring-loads the hammer arms 266 and 267 by pressure developed against pintle 270 along its lower face. After completion of the intake portion of the stroke, pin 272 (Figure 10) in exterior face of flywheel 84 of timing gear assembly 85 triggers release of trigger arm 203 through trigger finger 273, releasing pintle 270 from over the top of stop brace 271 allowing release of energy in spring assembly 257 to hammer arms 266 and 267, hammer links 268 and 269 and hammer 210. Hammer 210 strikes anvil plate 233 through washer 235, lifting valve plate 218 and all valves conditioned to deliver colorant connected by means of tips 217 of saxophone rods 215, 215a engaging valves 220 notches 221. Thus selected or conditioned valves are opened instantly, opening ports 274 in valve block 10 (Figure 9) as pressure of the delivery stroke of pistons 16 starts to develop within valve block 10 through conduits 11.

As main crank 96 starts its upward return through the exhaust stroke of pistons 16, downward pressure is exerted on spring leaf assembly 257 due to downward movement of arm link 253. Stop bar 271 athwart hammer arms 266 and 267 then engages the upper face of pintle 270 thus again spring-loading hammer arms 266 and 267 with potential energy to move hammer 210 downwardly. At the end of the delivery stroke and return of connecting rod 95 to upper kinematic dead center, pin 275 in the exterior face of wheel 84 of timing gear assembly 85 contacts finger 273 of trigger arm 203 releasing hammer arms 266 and 267 from pintle 270 causing hammer 210 to strike anvil plate 234 through washer 236 slamming valve plate 218 and selected or conditioned valves 220 to a closed position against exhaust ports 274 of valve block 10 cleanly cutting off all colorant delivery from orifices 274 placing valves 220 in by-pass condition. All dials 34 not set to impart delivery of a quantity corresponding to 1,000 parts or less of colorant move vertical saxophone rod elements 215 forward from the frame 216 by contact of pins 228 (Figure 2) withdrawing saxophone rod tips 217 from detent 221 of valves 220, whereupon said valves merely direct colorant to by-pass and to circulate through valve block 10 to return to associated storage vessels. Briefly stated, where saxophone rod 215a ends 217 are withdrawn from valves 220 detents 221 impact action of hammer 210 will not alter the position of valves 220. Springs 222 prevent saxophone rod 215 ends 217 from disengaging valve plate 218 and valve detents 221, except in "Standby" or "Continuous circulate" positions or when the individual dials 34 are set to impart more than 120 degrees of arc to rocking beams 20 for apparent delivery of more than 1,000 parts of colorant, as described.

*Cylinder head valve timing control*

Figure 15:
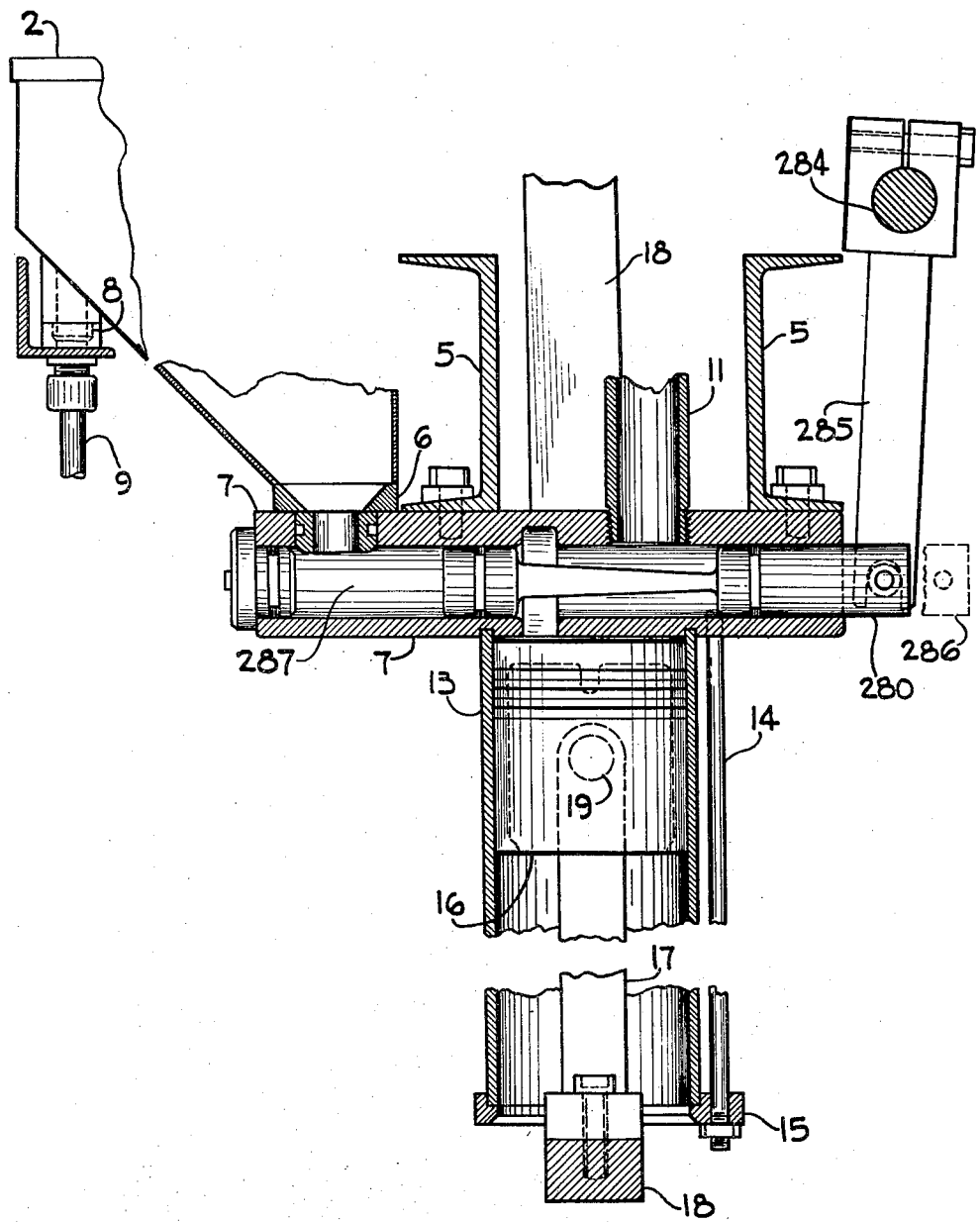
Figure 15 is an enlarged cross-sectional view along the line 15—15 of Figure 4.

Timing of cylinder head valves 280 within cylinder head bodies 7 and individual valves 220 in central valve block 10 also originates in timing gear assembly 85. Assuming main crank 96 and main connecting rod 95 to be at top (kinematic) dead center, as illustrated in Figure 6 as a starting position, timing gear assembly 85 is rotated counter-clockwise as clutch 70 is activated. Cam roller 281 contacts jack shaft cam 282 along cam face 283 moving jack shaft 284 counter-clockwise. Note only a very few degrees of arcuate motion of roll pin 281 completes movement of cam 282 downward. Counter-clockwise motion of jack shaft 284 (Figure 15) moves valve linkage rod 285 and cylinder head valve 280 outward to dotted position 286 to provide intake flow from storage tanks 2 and 3 through orifices 6 into the interior 287 of valve bodies 7 filling cylinder sleeves 13 as pistons 16 complete their intake stroke. As timing gear assembly 85 continues its rotation, cam rollpins 288 (Figure 6) and 289 engage cam 282. As roller 289 drops into pocket 290 of cam 282, roller 281 contacts the other arm 291 of cam 282 along face 292 reversing direction of rotation of jack shaft 284 moving valve 280 inwardly to exhaust position as shown in Figure 15. In exhaust position of valves 280, pistons 16 have just started their upward or exhaust stroke. Exhaust stroke of pistons 16 delivers the content of cylinders 13 to conduits 11 to central valve block 10 and to and about valves 220 to by-pass and return through conduits 9 or deliver to receiver 12 as directed by the condition of each unit valve in the multiple valve unit.

*The electrical system*

Figure 19:
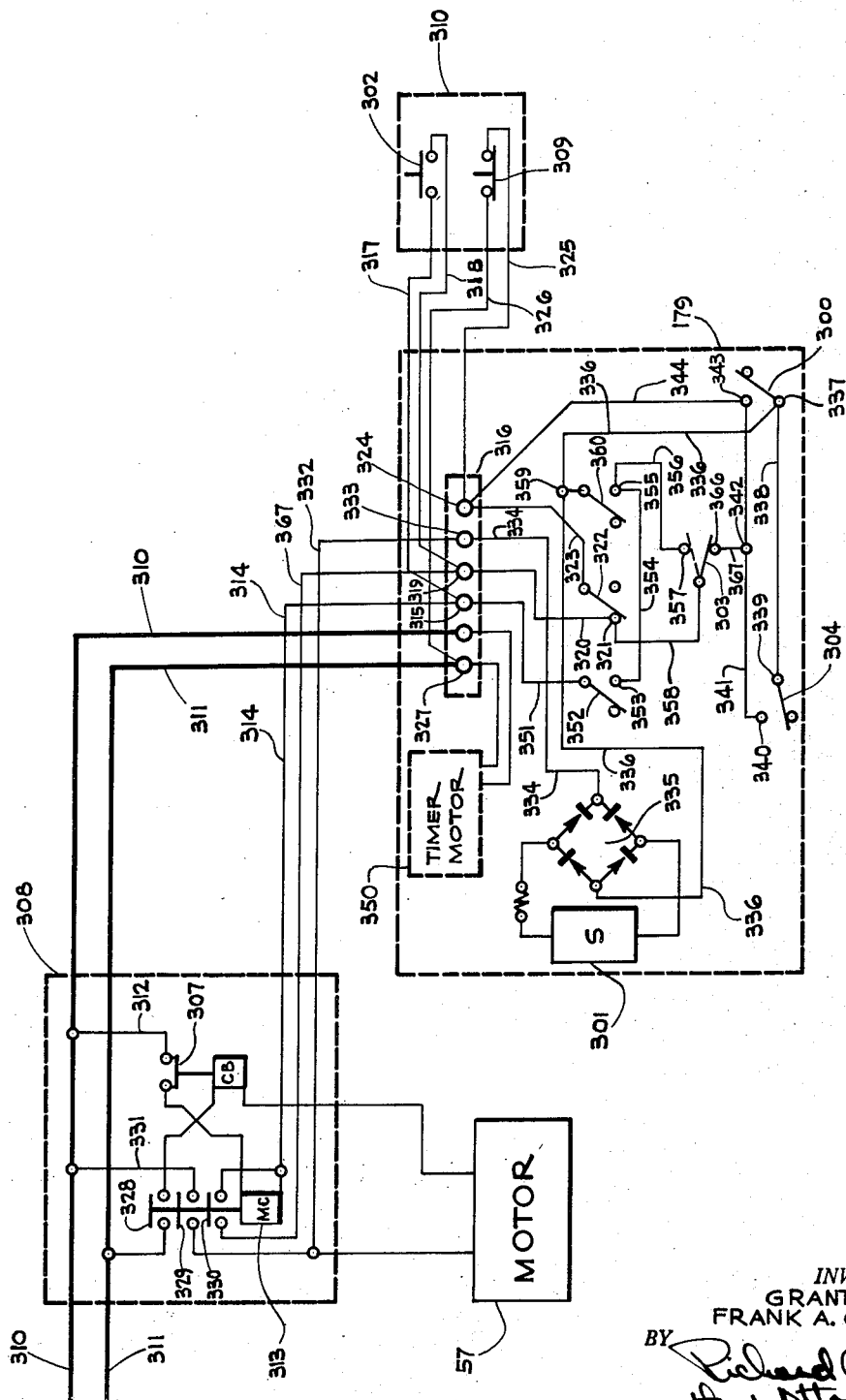
Figure 19 is a schematic diagram of the electrical circuit.

The electrical circuits may best be understood by describing them in corresponding relation to operational features of the machine and by reference to Figure 19 in particular.

First, assume that control knob 160 is set for "Continuous circulate." In this position, microswitch 304, normally open, is closed. Circuit breaker switch 307 in motor control box 308 is closed. Stop button 309 in starter box 310 is closed. Operation in "Continuous circulate" is instituted by momentarily closing starter button 302. The following circuit is thereby energized, starting with main power line 310 and following through conductor 312, circuit breaker switch 307, main magnetic contactor 313, conductor 314 to post 315 of six contact terminal strip 316. From post 315, the circuit continues through conductor 317, starter 302 and conductor 318 to terminal 319, line 320, terminal 321, closed switch 322, line 323, terminal 324, line 325, stop switch 309, line 326, terminal 327 completing the circuit to power line 311. Completion of the described circuit activates main magnetic contactor 313 closing magnetic contactors 328, 329 and 330, starting motor 57. A second circuit is also energized from power line 310 through line 331, magnetic contactor 329, line 332, terminal 333, conductor 334, rectifier 335, line 336, pole 337, line 338, terminal 339, closed microswitch 304 (closed in "Continuous circulate" position of control 160), terminal 340, line 341, poles 342 and 343, line 344, terminal 324, line 325, stop switch 309, conductor 326, terminal 327, power line 311, energizing solenoid 301, which releases clutch hook latch 178 alowing clutch 70 to engage the power train from the motor through the metering pump system causing the fluid colorant to be continuously circulated, as previously described.

Second, assume control knob 160 is placed in "Standby" position. This setting is normally employed when the machine operator is not to be present for an extended period. "Standby" position provides a cycle or program of on-and-off operation insuring uniformity of color dispersion at all times.

Tracing the circuits of interest in "Standby" position, a first circuit from power lines 310 and 311 energizes program timing motor 350 as long as the power lines are energized.

A second circuit is completed from power line 310 through conductor 312 overload circuit breaker switch 307, magnetic contactor 313, line 314, terminal 315, line 351, cam operated switch 352 (closed momentarily by programming of timer motor 350, thus activating the starting circuit), terminal 353, line 354, terminal 355, line 356, terminal 357, microswitch 303 (closed to terminal 357 positioned to "Standby"), line 358, terminal 321, cam operated timer stop switch 322 (normally in closed position, as illustrated) line 323, terminal 324, line 325, stop switch 309, line 326, pole 327, to main power line 311. Completion of this circuit activates main magnetic contactor 313, pulling magnetic contactors 328, 329 and 330 into the circuit, again starting motor 57. Cam operated switch 352 then opens, de-energizing the starter portion of the described circuit.

Subsequently, timer motor 350 directs closing of cam operated switch 360. In the circuit made thereby is included power line 310, conductor 331, magnetic contactor 329, line 332, terminal 333, line 334, rectifier 335, line 336, terminal 359, cam switch 360, pole 355, line 356, microswitch 303 closed against contact 357, line 358, pole 321, closed timer stop switch 322, line 323, terminal 324, line 325, stop switch 309, line 326, terminal 327 and power line 311. Closing of the described circuit activates solenoid 301, in turn engaging clutch 70 causing consequent circulation of colorant for agitation purposes for a programmed period.

At the end of the programmed period, the circuit operating solenoid 301 is de-energized by timer motor 350 opening switch 360, disrupting the circuit whereupon clutch 70 is withheld from operation and colorant circulation discontinued.

The circuit to the motor is de-energized by momentary opening of timer motor 350 cam operated switch 322 in series with stop switch 309. At the end of an eight minute idle period, the "Standby" circuit is again energized by momentary closing of normally open cam operated timer start switch 352, as described above.

To "Deliver" custom-mixed coating compositions, dial 100 is positioned for the desired number of quarts to be delivered of the ultimate custom color. Prerequisite to setting of dial 100, platform 101 is adjusted to fit the can to be filled, and placement of the can allows dial 100 to be set, as previously described. This control feature prevents delivery of colorant when no container is positioned to receive the product or the wrong size container is placed on platform 101 to correspond with its setting or adjustment.

Control knob 160 is set in "Deliver" position. Selected ones of dials 34, corresponding to the quantity and quality of the individual colors essential to the final custom color mix, are adjusted to the requisite quantities. A check is made to assure the total number of parts set on selected dials 34 does not exceed 1,000 parts. If more than 1,000 parts total are called for in setting of dials 34, receiving can 12 will overflow.

After the preliminary settings of the described controls has been made, starter button 302 is closed. Colorant delivery circuit is thereby energized from power line 310 including conductor 312, circuit breaker overload control 307, magnetic contactor 313, line 314, pole 315, line 317, closed starter switch 302, line 318, terminal 319, line 320, pole 321, line 358, microswitch 303, now in contact with pole 366 leading through line 367, terminals 342 and 343 to microswitch 300 (which upon proper dial setting of control 100 is in contact with terminal 343 closing the circuit), line 344, terminal 324, line 325, stop button switch 309, line 326, terminal 327 to power line 311. Upon closing starter 302, magnetic contactor 313 closes, energizing magnetic contactors 328, 329 and 330 starting motor 57.

A secondary circuit through closed stroke counter switch 300 is completed through terminal 337, conductors 336, rectifier 335, line 334, terminal 333, line 332, contactor 329, line 331, main line 310 and energized solenoid 301 which, as described previously, allows clutch 70 to engage until the machine has completed the requisite number of strokes, as set and determined by mechanical linkages associated with dial 100. As the last stroke is completed, microswitch 300 is opened, de-energizing the solenoid circuit and disengaging clutch 70, marking the end of the delivery cycle.

*Miscellaneous features*

There are several features of the machine not as yet described. One of these is the drag brake drum 76 (Figures 10, 12 and 14) keyed to horizontal shaft 71 preventing overrunning of clutch 70 through means of spring-loaded brake band 47 suspended on horizontal arm 48 from vertical frame 32 bringing friction to bear upon the surface of brake drum 76.

A second feature is a solvent vapor lung made of a solvent-resisting elastomer, housed in protective chest 94 (Figures 1 and 14). The interior of lung 93 opens into horizontal manifold conduit 97 which, in turn, has spaced take-off lines of flexible tubing 98 entering into the top section of storage tanks 2 and 3. As liquid colorant is drawn from the bottom of storage tanks 2 and 3, vapors in the lung, which may contain solvents and anti-skinning agents of a volatile nature, replace withdrawn colorant volume due to the partial vacuum created. Contrariwise, as liquid colorant is recirculated back to storage tanks 2 and 3, vapors in the said tanks are displaced and received by lung 93. This feature of the invention materially assists in reduction of the skinning problem inherent in certain qualities of protective and decorative coatings. While not essential to the invention, the vapor lung is a desirable refinement of the apparatus.

Large storage tanks 2, because of spacial considerations, are mounted remote from their corresponding metering units. Conduits 99 merely provide transmission means for colorant from remote storage tanks to their respective metering means.

In a second machine, power transmission through rotational mechanisms as described herein has been supplanted with a fluid operated cylinder of the hydraulic type which provides oscillation of the main crankshaft 25. Other modifications of similar nature are clearly within the skill of the art and substitution of equivalent mechanical devices for those specifically illustrated in the described machine is not to be precluded because of the specific means herein illustrated.

What we claim is:

1. A method of producing and dispensing custom colors which comprises simultaneously metering various quantities of a variety of liquid colorants from a number of storage vessels to a central delivery control point and simultaneously delivering from said central control point pre-selected ones of said metered liquids while re-circulating others of said liquid colorants from said control point back to and through said storage vessels to agitate and to maintain uniformity of the fluid dispersion of colorants stored therein.

2. A mixing and dispensing machine comprising a plurality of liquid supply means, a normally closed valve associated with each of said supply means remote from said supply means, metering means for simultaneous delivery of predetermined but individually variable quantities of liquids from said supply means to the valve associated therewith, impact means for opening selected ones of said valves whereby liquids metered from associated supply means may be dispensed and liquids metered to others of said valves by-passed and returned to their associated supply means.

3. A mixing and dispensing machine comprising a plurality of liquid supply means, a normally closed valve associated with each of said supply means, metering means for delivering liquid simultaneously from all of said supply means to the associated valves, means for opening selected ones of said valves whereby liquid from selected supply means may be dispensed and control means for varying the quantity of liquid metered from each of said supply means to the valve associated therewith.

4. A mixing and dispensing machine comprising a plurality of liquid supply means, a first and second valve means associated with each of said supply means, said first valve means controlling flow from said supply means, said second valve means normally closed to by-pass position, metering means associated with each of said first valve means adapted to deliver pre-set quantities of liquids from said first valve means and related supply to said second valve means, means to vary the quantities dispensed by said metering means, means for opening selected ones of said secondary valves whereby liquids from supply means associated with said valves are dispensed, and means to return other liquids metered to said secondary valves to their associated supply means.

5. A paint mixing and dispensing machine comprising a supporting framework, a plurality of supply tanks supported by said framework, a plurality of metering pumps associated with each of said tanks, a first valve means intermediate said tanks and said pumps, a second valved means associated with each of said pumps, means for opening selected ones of said second valved means to dispense liquid colorant from corresponding supply tanks, and means to by-pass liquid colorant through others of said second valved means to return said colorant to supply tanks associated therewith.

6. A paint mixing and dispensing machine comprising a supporting framework, a plurality of supply tanks supported by said framework, a plurality of metering pumps associated with each of said tanks, a first valve means intermediate said tanks and said pumps, a second valved means associated with each of said pumps, means for opening selected ones of said second valved means to dispense liquid colorant from corresponding supply tanks, and means to by-pass liquid colorant through others of said second valved means to return said colorant to supply tanks associated therewith, and impact means to control opening and closing of selected ones of said second valve means.

7. A custom color paint producing machine comprising a main frame, a plurality of supply means supported on said frame, a plurality of positive but controllable displacement piston pumps communicating and associated with each of said supply means, means to vary the individual displacement of each of said pumps from each of said supply means to a central multiple valved means, unit valves within said central valved means associated with each of said pumps and normally positioned to by-pass and return fluids metered thereto to associated supply means, said central valved means further adapted to dispense from selected ones of said unit valves the total quantity of liquid displaced by the pump associated therewith to provide a fluid coating composition of hue, value and chroma comparable with that selected from a known color gamut.

8. A mixing and dispensing machine comprising a plurality of liquid supply means, a normally closed valve associated with each of said supply means, a plurality of piston pumps adapted to deliver metered quantities of liquids from any one of said supply means to the valve associated therewith, said pumps further adapted by control means to individual pre-setting as to their displacement, said means governing the length of stroke of said pistons, and means for opening selected ones of said valves whereby liquids metered to said valves from associated supply means may be simultaneously dispensed.

9. A liquid metering device which comprises a number of liquid supply means, an equal number of valves normally in by-pass position associated therewith, variable displacement piston-pumps intermediate and communicating with said supply means and said valves, settable dial means adapted to control the length of stroke of each of the pistons of said pumps and the consequent displacement of liquids therefrom to the associated valves, selecting means associated with each of said dials adapted to condition certain of said valves in by-pass position to be opened to deliver liquids therefrom and to be closed to by-pass in timed relation to the displacement of said pumps, and impact means to open and to close conditioned ones of said valves.

10. A custom color paint dispensing machine which comprises a main frame, a plurality of supply means supported by said frame, metering piston pumps of variable stroke associated through a first valved means to each of said supply means, outlet ports and second valve means controlling said outlet ports associated with each of said pumps, settable dial means associated with each of said pumps adapted to vary the stroke of pistons associated with said pumps and to condition certain ones of said second valve means to deliver liquids metered thereto from said ports and others of said second valve means to remain in normal by-pass position to recirculate liquids metered thereto back to associated supply means, and timed impact means to open and to close conditioned ones of said second valves.

11. A custom color paint mixing and dispensing machine which comprises a frame, a number of liquid supply tanks supported by said frame, and equal number of metering piston pumps of variable stroke, valved cylinder heads in each of said pumps adapted to control intake from said supply tanks and exhaust therefrom to corresponding unit valves in a multiple valved dispensing unit, variation in stroke of each of said pumps quantitatively pre-selected through adjustable calibration means, said calibration means adapted further to condition selected ones of said unit valves to open and to close when driven by impact means timed to open and to close said unit valves to correspond with delivery of metered quantities of liquids from said pumps to said multiple valved dispensing unit.

References Cited in the file of this patent

UNITED STATES PATENTS

| | | |
|---|---|---|
| 2,462,019 | Bowman | Feb. 15, 1949 |
| 2,532,118 | Nicholson | Nov. 28, 1950 |